US 7,324,298 B2

(12) United States Patent
Ando

(10) Patent No.: US 7,324,298 B2
(45) Date of Patent: Jan. 29, 2008

(54) ELECTRONIC APPLIANCE AND FALL DETECTION METHOD

(75) Inventor: Yoshinori Ando, Kanagawa (JP)

(73) Assignee: Sony Corporation, Tokyo (JP)

( * ) Notice: Subject to any disclaimer, the term of this patent is extended or adjusted under 35 U.S.C. 154(b) by 94 days.

(21) Appl. No.: 10/561,265

(22) PCT Filed: Apr. 22, 2005

(86) PCT No.: PCT/JP2005/007720

§ 371 (c)(1),
(2), (4) Date: Dec. 19, 2005

(87) PCT Pub. No.: WO2005/106503

PCT Pub. Date: Nov. 10, 2005

(65) Prior Publication Data

US 2007/0121239 A1 May 31, 2007

(30) Foreign Application Priority Data

Apr. 28, 2004 (JP) ............................. 2004-134327
Jun. 30, 2004 (JP) ............................. 2004-194643

(51) Int. Cl.
*G11B 21/02* (2006.01)
*G11B 19/04* (2006.01)
(52) U.S. Cl. ......................................... 360/75; 360/60
(58) Field of Classification Search ..................... None
See application file for complete search history.

(56) References Cited

U.S. PATENT DOCUMENTS

2005/0270700 A1* 12/2005 Matsumoto ................. 360/261

2007/0030587 A1* 2/2007 Noda et al. ................. 360/75
2007/0047126 A1* 3/2007 Kobayashi et al. .......... 360/60

FOREIGN PATENT DOCUMENTS

| JP | 7-201124 | 8/1995 |
| JP | 2000-241442 | 9/2000 |
| JP | 3441668 | 6/2003 |

* cited by examiner

*Primary Examiner*—Andrew L. Sniezek
(74) *Attorney, Agent, or Firm*—Finnegan, Henderson, Farabow, Garrett & Dunner, L.L.P

(57) ABSTRACT

In an electronic appliance, accelerations in X-direction, in Y-direction that is orthogonal relative to the X-direction and in Z-direction that is orthogonal relative to both the X-direction and the Y-direction are synthesized and the size of the synthetic acceleration vector formed by synthesizing the accelerations is detected, associated with the clock time of the detection and stored in a synthetic acceleration memory (4). A fall candidate is detected when the size of the synthetic acceleration vector is stabilized at a value close to a for a predetermined time period and clock time T1 that is associated with the synthetic acceleration vector that has a size equal to predetermined value b and closest to the clock time T1 when the fall candidate is detected is determined by retrieving the sizes of the synthetic acceleration vectors stored in the synthetic acceleration memory (4). Then, the stability of the sizes of the synthetic acceleration vectors from clock time T2 to clock time T1 that corresponds to the size of the synthetic acceleration vector that was stored earliest in the synthetic acceleration memory (4) is detected. Then, the electronic appliance is determined to be falling when a fall candidate is detected and the stability is found within a predetermined range.

9 Claims, 11 Drawing Sheets

ELECTRONIC APPLIANCE AND FALL DETECTION METHOD

TECHNICAL FIELD

This invention relates to an electronic appliance that can detect a fall that is taking place and prevent a hard disc drive thereof from being destroyed. The present invention also relates to a fall detection method that can accurately detect a fall that is taking place. The present invention also relates to a contents reproduction apparatus that can detect a fall that is taking place and prevent the hard disc drive thereof from being destroyed.

The present invention contains subject matter related to Japanese Patent Application JP 2004-134327 filed in the Japanese Patent Office on Apr. 28, 2004 and Japanese Patent Application JP 2004-194643 filed in Japanese Patent Office on Jun. 30, 2004, the entire contents of which being incorporated herein by reference.

BACKGROUND ART

Existing portable electronic appliances are mostly equipped with a hard disc drive for the purpose of data storage capacity thereof. A hard disc drive includes a hard disc for storing data and a magnetic head for recording data to and reproducing data from the hard disc. When recording data to or reproducing data from the hard disc, the magnetic head moves to a position where it is located opposite to the hard disc.

In hard disc drives, the hard disc is driven to rotate when data are recorded to or reproduced from the hard disc so that air is drawn into the space between the magnetic head and the hard disc to lift the magnetic head. Therefore, if the power supply is abruptly interrupted and the hard disc stops rotating, air is no longer drawn into the space between the magnetic head and the hard disc so that the magnetic head can come to contact the hard disc to consequently destroy the hard disc drive.

For the purpose of preventing such a problem from taking place, the hard disc drive is provided with an auto-retract feature that retracts the magnetic head to and save it in a position where it is not located opposite to the hard disc when the power supply is interrupted.

Meanwhile, if a portable electronic appliance falls while data are being recorded to or reproduced from the hard disc thereof, the magnetic head at a position located opposite to the hard disc collides with the hard disc to consequently destroy the hard disc drive.

For the purpose of preventing the hard disc drive from being destroyed due to a fall, such portable electronic appliances are equipped with a feature of preventing the hard disc drive from being destroyed, the feature being adapted to recognize a fall, turn off the power supply of the hard disc drive and retract the magnetic head to and save it in a position where it is not located opposite to the hard disc by utilizing the auto-retract feature.

As a method of recognizing a fall, there has been proposed a method of determining the size of the synthetic acceleration vector synthetically prepared by detecting the accelerations in at least three directions that are not found on a same plane and then detecting that the size of the synthetic acceleration vector is stabilized for a predetermined period of time at or near the value of 0 (see, inter alia, Patent Document 1).

With the proposed method, a free fall from a 25 cm high position that is believed to be the limit of not destroying a hard disc drive by a fall is assumed and the magnetic head is retracted to and saved in a position where it is not located opposite to the hard disc when the period of time during which the size of the synthetic acceleration vector is stabilized at or near the value of 0 is 220 milliseconds or more because then it is possible to determine that the portable electronic appliance is falling.

However, with such an arrangement, it takes about 100 milliseconds from the time when it detects a fall to the time when the operation of retracting and saving the magnetic head is completed. Additionally, for certain hard disc drives, a free fall from a position that is less than 25 cm high is the limit of not being destroyed. In view of these circumstances, it may be not permissible to spend 220 milliseconds for determining a fall for the purpose of retracting and saving the magnetic head with the above-described method. More specifically, the time period that can be spent for determining a fall is about 50 milliseconds at longest.

Meanwhile, portable electronic appliances are carried by people. Oscillations take place as they are carried. Then, as indicated by X in FIG. 1 of the accompanying drawings, there may frequently arise a situation where the size of the synthetic acceleration vector is stabilized at or near the value of 0 for about 50 milliseconds, although a fall is not taking place.

Thus, with an arrangement where the magnetic head is retracted from the position where it is located opposite to the hard disc upon detecting the size of the synthetic acceleration vector that is stabilized at or near the value of 0 for about 50 milliseconds in order to prevent the hard disc drive from being destroyed, there may frequently arise a situation where the magnetic head is retracted from the position where it is located opposite to the hard disc although the portable electronic appliance is not falling.

If the magnetic head is retracted from the position where it is located opposite to the hard disc because of an oscillation that takes place while the portable electronic appliance is being carried, the operation of recording data to or reproducing data from the hard disc is interrupted while the portable electronic appliance is being carried and operated. As the operation of recording data to or reproducing data from the hard disc is interrupted, the user of the portable electronic appliance falls into trouble. For example, the sound being produced from the portable electronic appliance may be interrupted while the user is listening to it.

The number of times of utilization of the auto-retract feature is generally limited for such hard disc drives. In other words, if a situation where the magnetic head is retracted from the position where it is located opposite to the hard disc because it is determined that the portable electronic appliance is falling although it is actually not falling, the service life of the auto-retract feature is curtailed to consequently make the hard disc drive vulnerable to destruction and allow the magnetic head to collide with the hard disc.

Additionally, the size of the synthetic acceleration vector of accelerations in three directions that are not found on the same plane becomes equal to 0 only in the case of free fall. In other words, when the portable electronic appliance falls along a slope or when it falls while it is spinning, the size of the synthetic acceleration vector does not become equal to 0. It is found to be not close to 0 but equal to a certain value smaller than the size of the original synthetic acceleration vector for a predetermined period of time as shown in FIG. 2 of the accompanying drawings. Thus, if it is so arranged as to detect a situation where the size of the synthetic acceleration vector is equal to 0 is detected to determine a fall of the portable electronic appliance, such an arrangement cannot detect a fall along a slope or a spinning fall and hence cannot prevent the hard disc drive from being destroyed. Patent Document 1: Jpn. Patent No. 3441668

DISCLOSURE OF THE INVENTION

Problems to be Solved by the Invention

Therefore, it is an object of the present invention to provide an electronic appliance and a fall detection method that can minimize detection errors and reliably detect a fall of the electronic appliance.

Another object of the present invention is to provide a contents reproduction apparatus that can prevent a disc-shaped recording medium contained therein from being damaged due to a fall and allow the user to continue the ongoing contents, if any.

In an aspect of the present invention, the above object is achieved by providing an electronic appliance including: an acceleration detecting section for detecting the acceleration in a first direction, the acceleration in a second direction orthogonal relative to the first direction and the acceleration in a third direction orthogonal relative to the first direction and the second direction; a synthetic acceleration vector detecting section for detecting the size of the synthetic acceleration vector formed by synthesizing the acceleration in the first direction, the acceleration in the second direction and the acceleration in the third direction detected by the acceleration detecting section; a storage section for storing the size of the synthetic acceleration vector detected by the synthetic acceleration vector detecting section, associating it with the clock time of the detection by the synthetic acceleration vector detecting section of the acceleration in the first direction, the acceleration in the second direction and the acceleration in the third direction; a first stability computing section for computing the stability of the synthetic accelerations in a predetermined time period at and near clock time T0 when the size of the synthetic acceleration vector as detected by the synthetic acceleration vector detecting section becomes equal to a predetermined value $a$ ($a \geq 0$); a second stability computing section for retrieving the sizes of the synthetic acceleration vectors stored in the storage section, reading out clock time T1 that is associated with the synthetic acceleration vector of a predetermined value b (b>a), closest to the clock time T0 and preceding the clock time T0 from the storage section and computing the stability of the synthetic accelerations in a predetermined time period at and near the clock time T1; and a fall determining section for determining that the electronic appliance is falling when the first stability is found within a predetermined range and the second stability is found within another predetermined range.

In another aspect of the present invention, there is provided a fall detection method for detecting a fall of an electronic appliance including: an acceleration detecting step of detecting the acceleration in a first direction, the acceleration in a second direction orthogonal relative to the first direction and the acceleration in a third direction orthogonal relative to the first direction and the second direction; a synthetic acceleration vector detecting step of detecting the size of the synthetic acceleration vector formed by synthesizing the acceleration in the first direction, the acceleration in the second direction and the acceleration in the third direction detected in the acceleration detecting step; a storing step of storing the size of the synthetic acceleration vector detected in the synthetic acceleration vector detecting step, associating it with the clock time of the detection in the synthetic acceleration vector detecting step of the acceleration in the first direction, the acceleration in the second direction and the acceleration in the third direction; a first stability computing step of computing the stability of the synthetic acceleration in a predetermined time period at and near clock time T0 when the size of the synthetic acceleration vector as detected in the synthetic acceleration vector detecting step becomes equal to a predetermined value $a$ ($a \geq 0$); a second stability computing step of retrieving the sizes of the synthetic acceleration vectors stored in the storing step, reading out clock time T1 that is associated with the synthetic acceleration vector of a predetermined value b (b>a), closest to the clock time T0 and preceding the clock time T0 from the storage step and computing the stability of the synthetic accelerations in a predetermined time period at and near the clock time T1; and a fall determining step of determining that the electronic appliance is falling when the first stability is found within a predetermined range and the second stability is found within another predetermined range.

In still another aspect of the invention, there is provided a contents reproduction apparatus including: a reproduction section for reproducing data from a disc-shaped recording medium; a buffer memory for temporarily buffering the data reproduced from the reproduction section; a decoding section for decoding and outputting the data accumulated in the buffer memory; an acceleration detecting section for detecting the acceleration in a first direction, the acceleration in a second direction orthogonal relative to the first direction and the acceleration in a third direction orthogonal relative to the first direction and the second direction; a synthetic acceleration vector detecting section for detecting the size of the synthetic acceleration vector formed by synthesizing the acceleration in the first direction, the acceleration in the second direction and the acceleration in the third direction detected by the acceleration detecting section; a storage section for storing the size of the synthetic acceleration vector detected by the synthetic acceleration vector detecting section, associating it with the clock time of the detection by the synthetic acceleration vector detecting section of the acceleration in the first direction, the acceleration in the second direction and the acceleration in the third direction; a first stability computing section for computing the stability of the synthetic acceleration in a predetermined time period at and near clock time T0 when the size of the synthetic acceleration vector as detected by the synthetic acceleration vector detecting section becomes equal to a predetermined value $a$ ($a \geq 0$); a second stability computing section for retrieving the sizes of the synthetic acceleration vectors stored in the storage section, reading out clock time T1 that is associated with the synthetic acceleration vector of a predetermined value b (b>a), closest to the clock time T0 and preceding the clock time T0 from the storage section and computing the stability of the synthetic accelerations in a predetermined time period at and near the clock time T1; a fall determining section for determining that the electronic appliance is falling when the first stability is found within a predetermined range and the second stability is found within another predetermined range; and a retracting section for retracting the head reading signals from a disc-shaped recording medium from the disc-shaped recording medium when it is determined by the fall determining section that the electronic appliance is falling.

BEST MODE FOR CARRYING OUT THE INVENTION

Now, the best mode for carrying out the invention will be described in detail by referring to the accompanying drawings.

Figure 1:
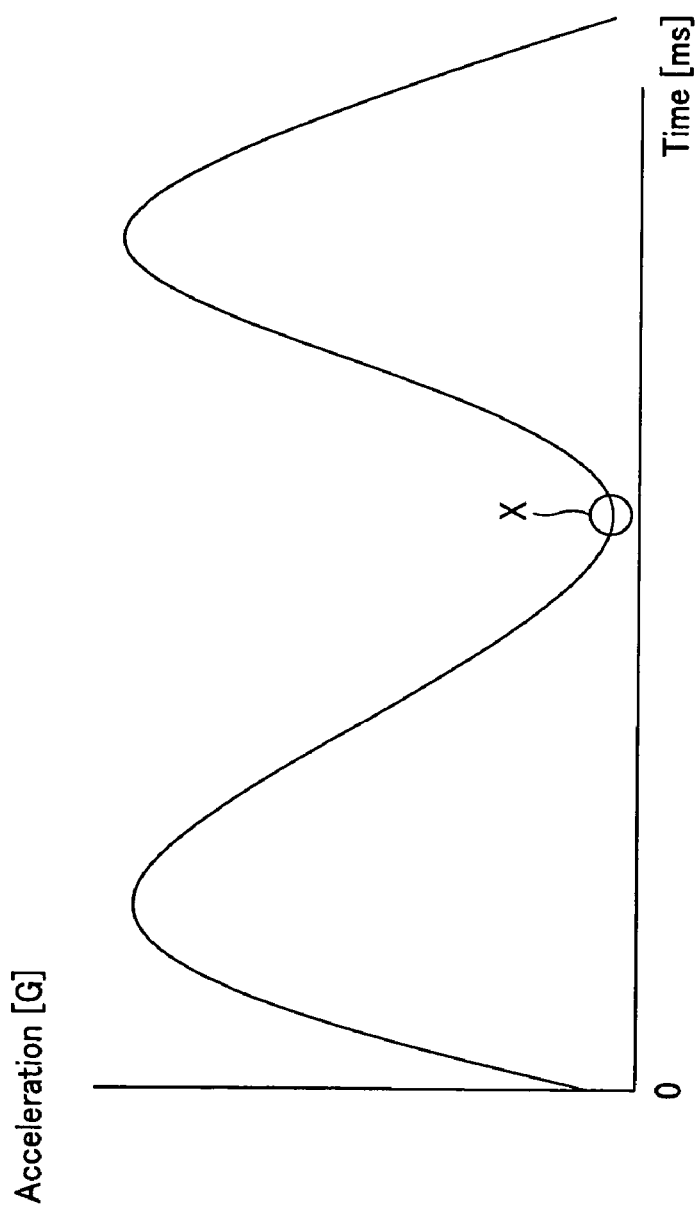
FIG. 1 is a graph schematically illustrating the size of the synthetic acceleration vector of an electronic appliance when the latter is being carried by a walking person.
Figure 2:
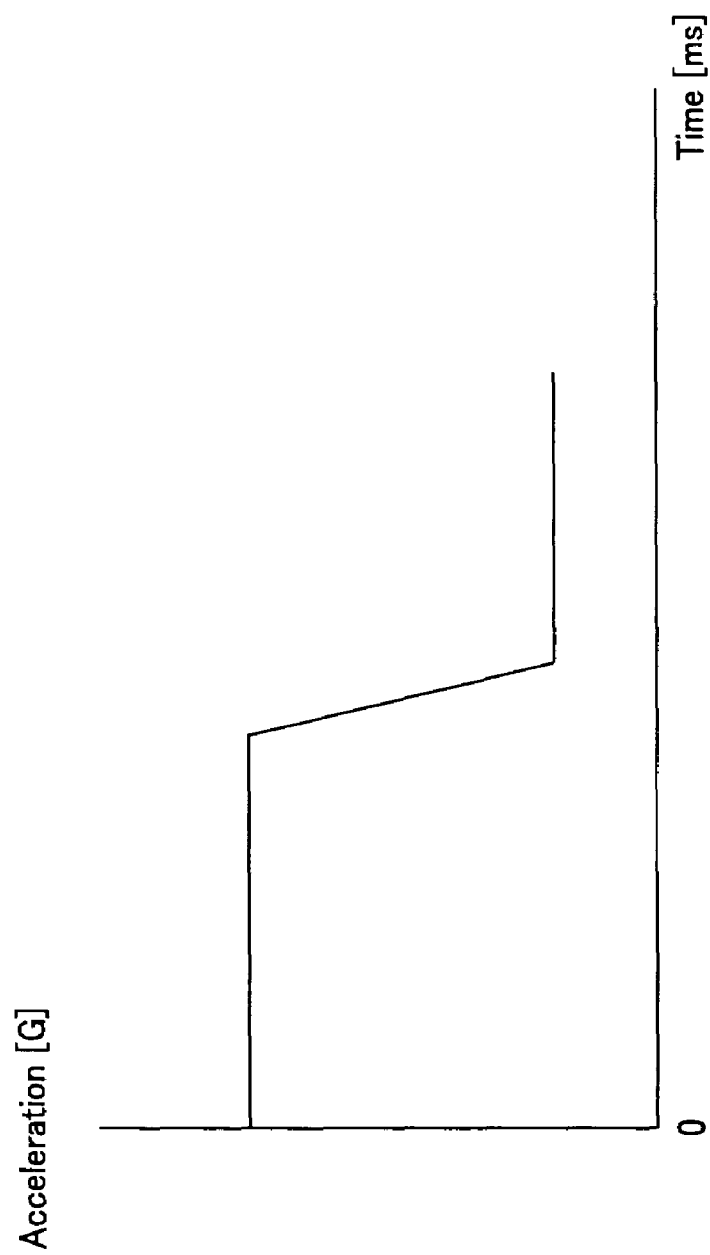
FIG. 2 is a graph schematically illustrating the change in the size of the synthetic acceleration vector of an electronic appliance when the latter is falling along a slope or spinning.
Figure 3:
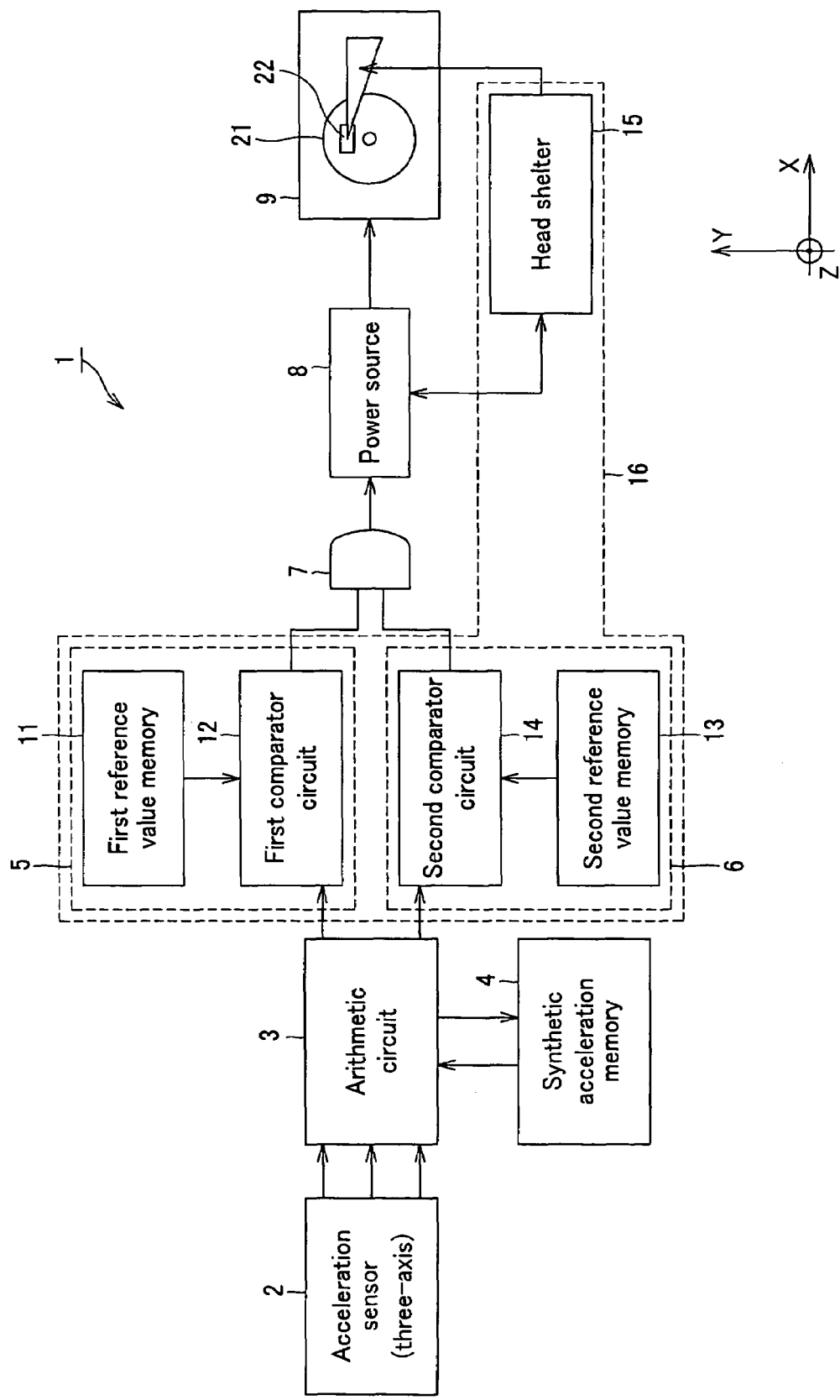
FIG. 3 is a schematic block diagram of an embodiment of electronic appliance according to the invention.

Referring to FIG. 3, an embodiment of electronic appliance according to the present invention, or electronic appliance 1, includes an acceleration sensor 2 that detects and outputs the acceleration in the X-direction in FIG. 3, the acceleration in the Y-direction that is orthogonal relative to the X-direction and the acceleration in the Z-direction that is orthogonal relative to both the X-direction and the Y-direction, an arithmetic circuit 3 that computationally operates according to the signal output from the acceleration sensor 2 and a synthetic acceleration memory 4 connected to the arithmetic circuit 3. The acceleration sensor 2 is an inertia sensor adapted to observe the component obtained by subtracting the gravitational acceleration component from the motional acceleration component for each of the X-, Y- and Z-directions as accelerations of the respective directions.

The electronic appliance 1 further includes a fall candidate detecting section 5 that detects the possibility of a fall of the electronic appliance 1 according to a signal output from the arithmetic circuit 3, a stability detecting section 6 that detects the stability of the electronic appliance 1 from clock time T2 to clock time T1 according to the signal output from the arithmetic circuit 3, a fall determining section 7 that determines if the electronic appliance 1 is falling or not according to the signal supplied from the fall candidate detecting section 5 and the stability detecting section 6, a power source 8 that is supplied with signals from the fall determining section 7, a hard disc drive 9 that is driven to operate by power supplied from the power source 8 and a head retracting section 15 connected to the power source 8 and the hard disc drive 9.

Note that the control section 16 is constituted by the fall candidate detecting section 5, the stability detecting section 6 and the head retracting section 15. The control section 16 operates under the control of the main CPU and the like of the electronic appliance.

The electronic appliance 1 is a portable one so that the user can use it while he or she is moving, if he or she, whichever appropriate, is walking for the move.

The arithmetic circuit 3 detects the size of the synthetic acceleration vector that is synthesized from the acceleration in the X-direction, the acceleration in the Y-direction and the acceleration in the Z-direction, associates it with the clock time T0 when the acceleration in the X-direction, the acceleration in the Y-direction and the acceleration in the Z-direction are detected by the acceleration sensor 2 and stores it in the synthetic acceleration memory 4.

Additionally, the arithmetic circuit 3 determines the stability S of the magnitude of the synthetic acceleration detected at the clock time T0 by determining the sizes of the synthetic acceleration vectors from clock time T0', which precedes the clock time T0 by a predetermined time period, to the clock time T0. In this embodiment, the time period from the clock time T0' to the clock time T0 is defined to be equal to 40 milliseconds. The arithmetic circuit 3 determines the stability S of the synthetic acceleration vector by computing the standard deviation σ1 of the sizes of the synthetic acceleration vectors from the clock time T0' to the clock time T0.

Still additionally, when the largest value of the synthetic acceleration vectors utilized for the computation of the stability S is smaller than a predetermined value $\underline{a}$ ($a \geq 0$), the arithmetic circuit 3 supplies the stability S of the size of the synthetic acceleration vector to the fall candidate detecting section 5. In this embodiment, the standard deviation σ1 is supplied to the fall candidate detecting section 5 when the largest value of the sizes of the synthetic acceleration vectors that are utilized for the computation of the standard deviation σ1 is smaller than $\underline{a}$. Additionally, in this embodiment, the predetermined value $\underline{a}$ is defined as $\underline{a}$=0.4. The stability S may alternatively be supplied to the fall candidate detecting section 5 when the average of all or part of the sizes of the synthetic acceleration vectors that are utilized for the computation of the stability S is smaller than the predetermined value $\underline{a}$.

Furthermore, the arithmetic circuit 3 retrieves the sizes of the synthetic acceleration vectors stored in the synthetic acceleration memory 4 and detects the clock time T1 that is associated with the synthetic acceleration vectors whose size is equal to a predetermined value b (b>a) and closest to the clock time T0, in other words, the clock time T1 that is associated with the data stored most recently in the synthetic acceleration vectors having a size of b that are stored in the synthetic acceleration memory 4. In this embodiment, newly stored synthetic acceleration vectors are sequentially retrieved in the descending order of their sizes. The arithmetic circuit 3 detects clock time T2 that is associated with the size of the oldest synthetic acceleration vector that is stored in the synthetic acceleration memory 4. Then, it detects the dispersion U of the sizes of the synthetic acceleration vectors between the clock time T2 and the clock time T1 (to be referred to as the dispersion of the sizes of the past synthetic acceleration vectors hereinafter) and supplies it to the stability detecting section 6. In this embodiment, the dispersion U of the sizes of the past synthetic acceleration is computed by detecting the standard deviation σ2 from the clock time T1 to the clock time T2. In this embodiment, the predetermined value b is defined as b=0.8.

The synthetic acceleration memory 4 stores the size of the synthetic acceleration vector computed by the arithmetic circuit 3 for a predetermined time period. The time period for which the size of a synthetic acceleration vector is stored in the synthetic acceleration memory 4 may be defined arbitrarily. In this embodiment, the size of each synthetic acceleration vector is stored for the time period of about 240 milliseconds, which are equal to about ¼ of a second. In other words, the clock time T2 is 240 milliseconds before the clock time T0. The reason why the size of each synthetic acceleration vector is stored for about ¼ of a second will be described later.

The fall candidate detecting section 5 detects a fall candidate that indicates that the electronic appliance 1 can be falling according to the stability S of the synthetic acceleration vector supplied from the arithmetic circuit 3. The fall candidate detecting section 5 detects a fall candidate by determining if the size of the synthetic acceleration vector supplied from the arithmetic circuit 3 is found within a predetermined range or not. In this embodiment, a fall candidate is detected by detecting if the standard deviation σ1 is smaller than a predetermined value or not because the stability S is indicated as the standard deviation σ1.

In this embodiment, the fall candidate detecting section 5 includes a first reference value memory 11 and a first comparator circuit 12 to which signals are supplied from the arithmetic circuit 3 and the first reference value memory 11. The first reference value memory 11 stores the upper limit value (to be also referred to as the first upper limit value) M1 of the standard deviation σ1 that is determined to be of a fall candidate and supplies the first upper limit value M1 to the first comparator circuit 12. The first comparator circuit 12 compares the standard deviation σ1 supplied from the arithmetic circuit 3 and the first upper limit value M1 supplied from the first reference value memory 11 and detects a fall candidate when the standard deviation σ1 is smaller than the first upper limit value M1. Then, the first comparator circuit 12 outputs HIGH.

The stability detecting section 6 detects that the electronic appliance 1 is in a stable state from the clock time T2 to the clock time T1 according to the dispersion U of the sizes of the past synthetic acceleration vectors supplied from the arithmetic circuit 3. The stability detecting section 6 detects that the electronic appliance 1 is in a stable state from the clock time T2 to the clock time T1 by determining if the dispersion U of the sizes of the past synthetic acceleration vectors supplied from the arithmetic circuit 3 is found within a predetermined range or not. In this embodiment, the dispersion U of the sizes of the past synthetic acceleration vectors is shown as the standard deviation σ2 and hence the stability detecting section 6 detects that the electronic appliance 1 is in a stable state from the clock time T2 to the clock time T1 by detecting that the standard deviation σ2 is smaller than a predetermined value.

In this embodiment, the stability detecting section 6 includes a second reference value memory 13 and a second comparator circuit 14 to which signals are supplied from the arithmetic circuit 3 and the second reference value memory 13. The second reference value memory 13 stores the upper limit value (to be also referred to as the second upper limit value) M2 of values by which the electronic appliance 1 is in a stable state from the clock time T2 to the clock time T1 and supplies the second upper limit value M2 to the second comparator circuit 14. The second comparator circuit 14 compares the standard deviation σ2 supplied from the arithmetic circuit 3 and the second upper limit value M2 supplied from the second reference value memory 13 and determines that the electronic appliance 1 is in a stable state from the clock time T2 to the clock time T1 when the standard deviation σ2 is smaller than the second upper limit value M2. Then, the second comparator circuit 14 outputs HIGH.

In this embodiment, the fall determining section 7 includes an AND circuit, which determines that the electronic appliance 1 is falling and outputs a signal when both the signal supplied from the fall candidate detecting section 5 and the signal supplied from the stability detecting section 6 are HIGH.

The reason why the electronic appliance 1 is determined to be falling when both the signal supplied from the fall candidate detecting section 5 and the signal supplied from the stability determining section 6 are HIGH, or when a fall candidate is detected and the electronic appliance 1 is detected to be in a stable state from the clock time T2 to the clock time T1 will be discussed below.

Figure 4:
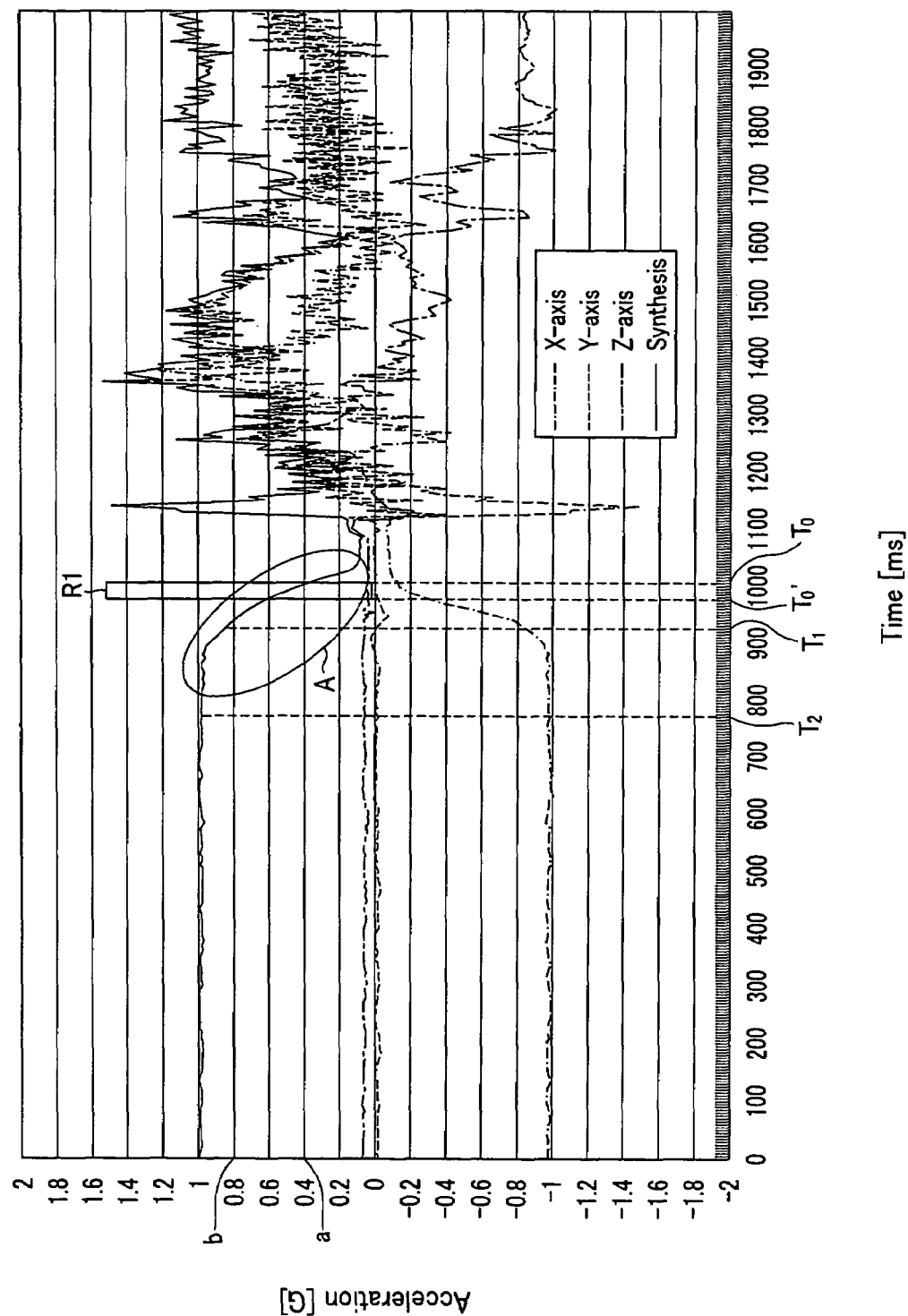
FIG. 4 is a graph illustrating the change in the size of the synthetic acceleration vector of an electronic appliance when the latter is freely falling.

As the electronic appliance 1 falls freely, the size of the synthetic acceleration vector is found to be close to 0 for a predetermined time as indicated by R1 in FIG. 4. Thus, the electronic appliance 1 can detects that it can be falling when it detect that the synthetic acceleration vector is found to be close to 0 for the predetermined time.

When the electronic appliance 1 falls along a slope or while it is spinning, the size of the synthetic acceleration vector is not found to be close to 0 but takes a constant value that is smaller than the size of the original synthetic acceleration vector for a predetermined time period. Therefore, the electronic appliance 1 can detect that it can be falling when it detects that the size of the synthetic acceleration vector is smaller than a constant value that is smaller than $\underline{a}$ and in a stable state for the predetermined time period.

However, if the user is walking, carrying the electronic appliance 1, or if the electronic appliance 1 is otherwise moving, the size of the synthetic acceleration vector can be found to be close to 0 for a predetermined time period or, if not close to 0, in a stable state with its value smaller than the size of the original synthetic acceleration vector for the predetermined time period as indicated by R2 in FIG. 4, although the electronic appliance 1 is not falling.

Thus, if the size of the synthetic acceleration vector is found to be in a stable state with its value close to a for a predetermined time period, the electronic appliance 1 may not be falling.

Figure 5:
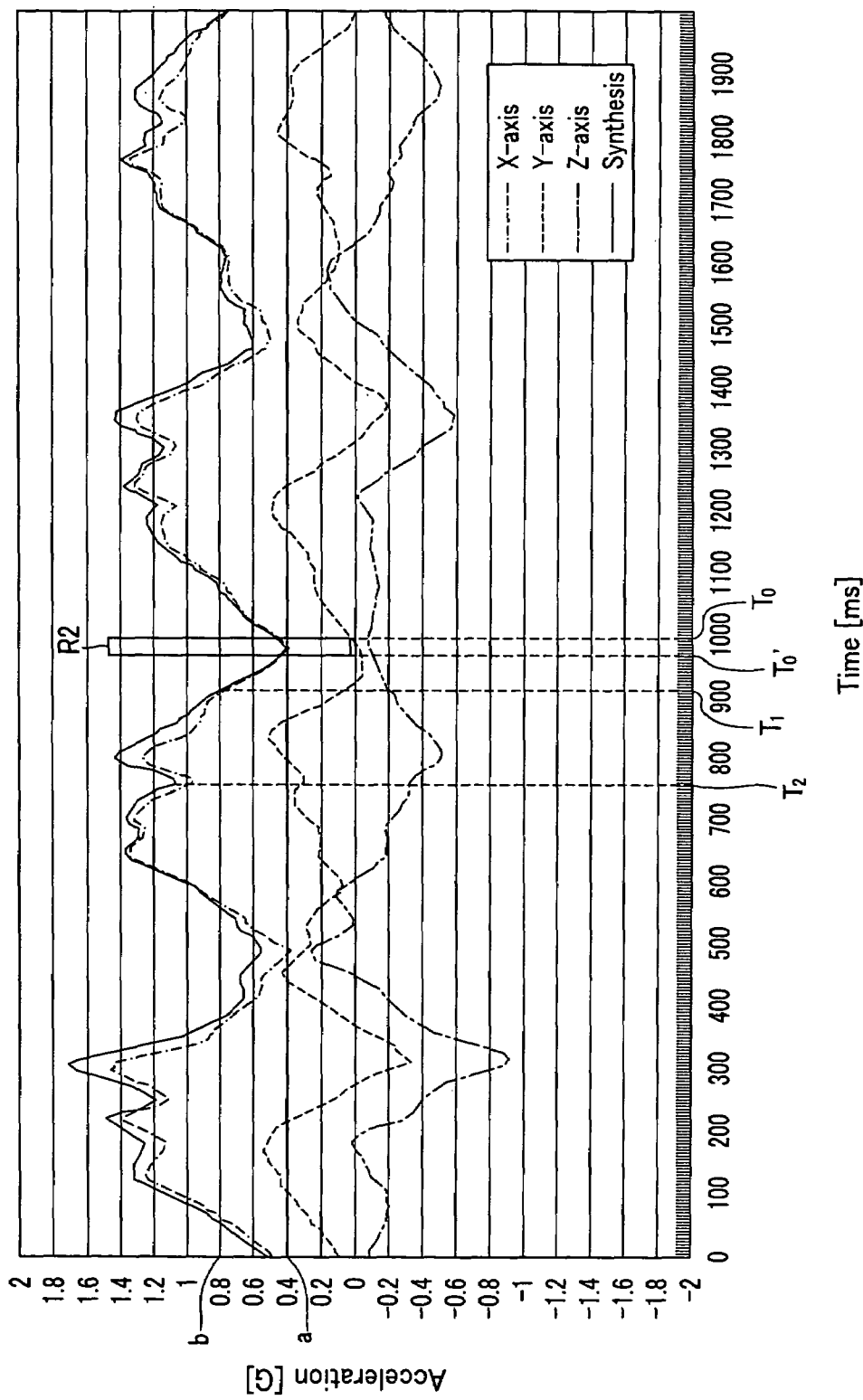
FIG. 5 is a graph illustrating the change in the size of the synthetic acceleration vector of an electronic appliance when the latter is being carried by a walking person.

However, as shown in FIG. 5, when the user is carrying the electronic appliance 1, the size of the synthetic acceleration vector is incessantly changing. When, on the other hand, the electronic appliance 1 falls from a stand still state, the size of the synthetic acceleration vector is rapidly reduced from a stable state and comes into another stable state with its value equal to a predetermined value that is smaller than $\underline{a}$ as indicated by A in FIG. 4.

Therefore, it is possible to accurately detect that the electronic appliance 1 is falling by detecting that the size of the synthetic acceleration vector of the electronic appliance 1 comes into a stable state with its value equal to a predetermined value that is smaller than $\underline{a}$ and the size of the synthetic acceleration vector of the electronic appliance 1 was not dispersing in the past, in other words, that the electronic appliance 1 is a fall candidate and the electronic appliance 1 was stable from the clock time T2 to the clock time T1.

Note that this embodiment is aimed to prevent the electronic appliance 1 from being erroneously detected to be falling because of the oscillations of the electronic appliance 1 that arise as the user walks, carrying the electronic appliance 1 with him or her. The oscillations of an object that arise as the person who carries it walks show a frequency of about 2 Hz. Therefore, if the electronic appliance 1 stores the sizes of the synthetic acceleration vectors that are detected within about ¼ seconds, it is possible to discriminate the oscillations of the electronic appliance 1 that arise as the user walks, carrying it with him or her from a fall.

The power source 8 supplies electric power to the hard disc drive 9. The power source 8 is turned off when a signal is supplied from the fall determining section 7.

The hard disc drive 9 includes a hard disc 21 that stores data and a magnetic head 22 for recording data to and reproducing data from the hard disc 21. The hard disc drive 9 is driven to operate by electric power supplied from the power source 8.

When data are reproduced from or recorded to the hard disc 21 in the hard disc drive 9, the hard disc 21 is driven to rotate so that air is drawn into the space between the magnetic head 22 and the hard disc 21 to lift the magnetic head.

The hard disc drive 9 is provided with an auto-retract feature of retracting the magnetic head 22 to and save it in a position where the magnetic head 22 is not located opposite to the hard disc 21 when the power source 8 is turned off. With the auto-retract feature, it is possible to prevent the magnetic head 22 from colliding with the hard disc 21 when the power source 8 is turned off and the hard disc 21 stops rotating accordingly.

Additionally, when the electronic appliance 1 falls, a signal is supplied from the fall determining section 7 to turn off the power source 8 of the hard disc drive 9 and the auto-retract feature is activated to retract the magnetic head 22 to and save it in a position where the magnetic head 22 is not located opposite to the hard disc 21. Therefore, it is possible to prevent the magnetic head 22 from colliding with the hard disc 21 to consequently destroy the hard disc drive 9.

The head retracting section 15 retracts the magnetic head 22 from the position where the magnetic head 22 is located opposite to the hard disc 21. In this embodiment, the auto-retract feature retracts the magnetic head 22 to and save it in a position where the magnetic head 22 is not located opposite to the hard disc 21 when the power source 8 is turned off. Note that it may alternatively be so arranged that the head retracting section 15 retracts and saves the magnetic head 22 regardless if the power source 8 is turned off or not.

Figure 6:
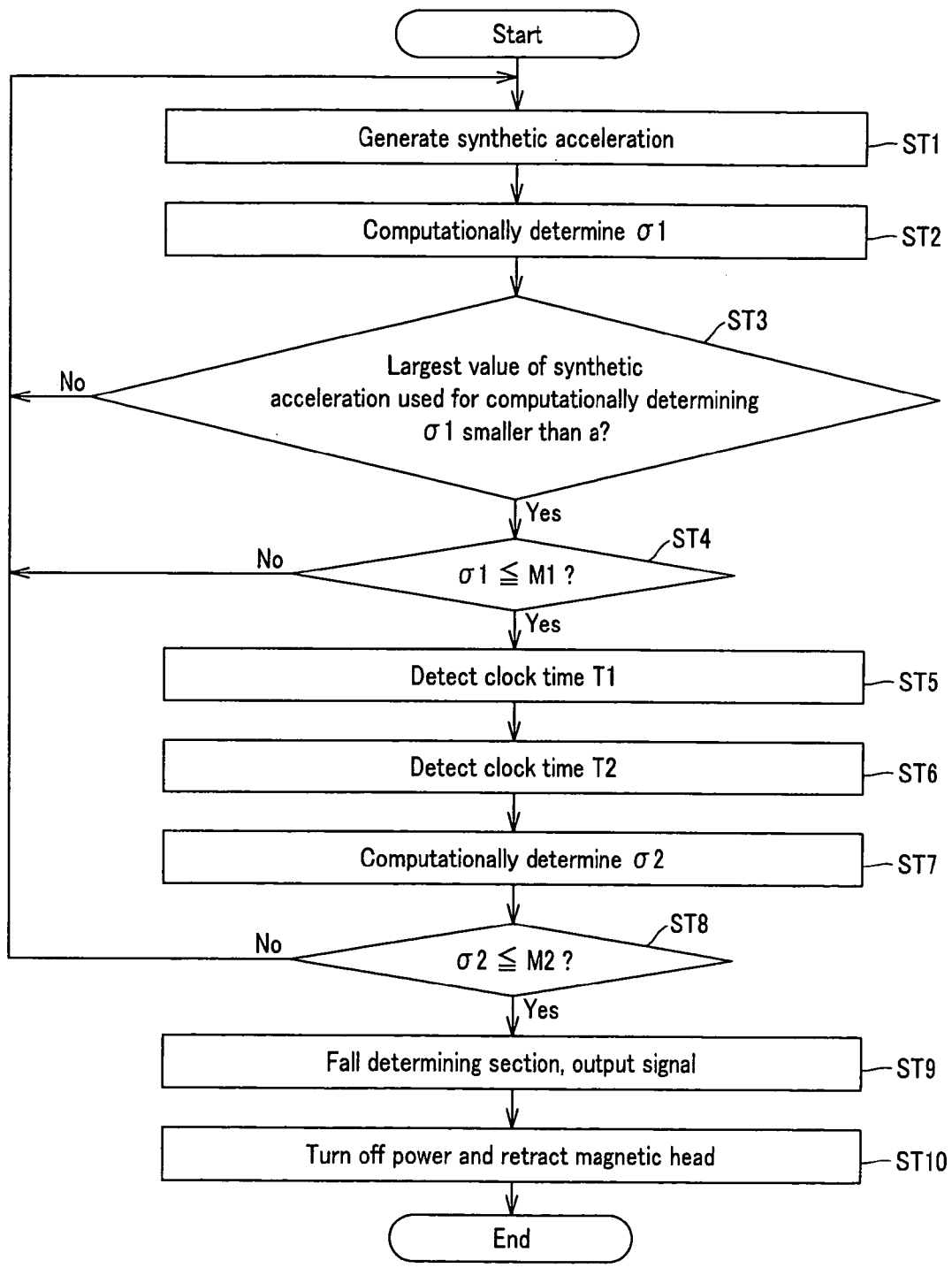
FIG. 6 is a flowchart of the operation of an embodiment of electronic appliance according to the invention from the time when it detects a fall to the time when it retracts and saves its magnetic head.

Now, the method of retracting the magnetic head 22 to and save it in a position where it is not located opposite to the hard disc 21 when the electronic appliance 1 falls will be described below by referring to the flowchart of FIG. 6.

In the electronic appliance 1, the acceleration sensor 2 constantly detects the acceleration in the X-direction, the acceleration in the Y-direction and the acceleration in the Z-direction and outputs them to the arithmetic circuit 3. The arithmetic circuit 3 synthesizes the acceleration in the X-direction, the acceleration in the Y-direction and the acceleration in the Z-direction supplied to it and detects the size of the synthetic acceleration vector obtained by the synthesis. Then, it stores the synthetic acceleration vector in the synthetic acceleration memory 4, associating it with the clock time when the acceleration in the X-direction, the acceleration in the Y-direction and the acceleration in the Z-direction are detected (Step ST1).

Thereafter, the arithmetic circuit 3 computes the standard deviation σ1 of the sizes of the synthetic acceleration vectors from clock time T0' to clock time T0 from the sizes of the synthetic acceleration vectors stored in the synthetic acceleration memory 4 (Step ST2).

Subsequently, the arithmetic circuit 3 determines if the largest value of the sizes of the synthetic acceleration vectors utilized to compute the standard deviation σ1 in Step ST2 is not smaller than a predetermined value $\underline{a}$ or smaller than the value $\underline{a}$. The processing operation returns to Step ST1 when the largest value of the sizes of the synthetic acceleration vectors is not smaller than the predetermined value $\underline{a}$, whereas it proceeds to Step ST4 when the largest value is smaller than the predetermined value $\underline{a}$ (Step ST3).

Then, the arithmetic circuit 3 supplies the standard deviation σ1 to the first comparator circuit 12. The first comparator circuit 12 compares the standard deviation σ1 supplied from the arithmetic circuit 3 with the first upper limit value M1 stored in the first reference value memory 11. When the standard deviation σ1 is not greater than the first upper limit value M1, the first comparator circuit 12 determines that it is a fall candidate and outputs HIGH, which is then supplied to the fall determining section 7. When, on the other hand, the standard deviation σ1 is greater than the first upper limit value M1, the first comparator circuit 12 outputs LOW (Step ST4).

Additionally, the arithmetic circuit 3 retrieves the sizes of the synthetic acceleration vectors stored in the synthetic acceleration memory 4 and detects the clock time T1 that is associated with the synthetic acceleration vector having a predetermined size b and closest to the clock time T0 (Step ST5).

Then, the arithmetic circuit 3 detects the clock time T2 that is associated with the size of the synthetic acceleration vector stored earliest in the synthetic acceleration memory 4 (Step ST6).

Thereafter, the arithmetic circuit 3 computes the standard deviation σ2 of the sizes of the synthetic acceleration vectors from the clock time T2 to the clock time T1 and supplies it to the second comparator circuit 14 (Step ST7).

Then, the second comparator circuit 14 compares the standard deviation σ2 supplied from the arithmetic circuit 3 and the second upper limit value M2 stored in the second reference value memory 13. When the standard deviation σ2 exceeds the second upper limit value M2, the second comparator circuit 14 determines that the stability of the electronic appliance 1 is found within a predetermined range from the clock time T2 to the clock time T1 and outputs HIGH, which is then supplied to the fall determining section 7. When, on the other hand, the standard deviation σ2 is not greater than the second upper limit value M2, the second comparator circuit 14 outputs LOW (Step ST8).

Thereafter, the fall determining section 7 determines that the electronic appliance 1 is falling because it is a fall candidate and the stability of the electronic appliance 1 was found within a predetermined range from the clock time T2 to the clock time T1 and outputs a signal, which is supplied to the power source 8. More specifically, if the fall determining section 7 detects that the signal supplied from the first comparator circuit 11 in Step ST4 is HIGH and the signal supplied from the second comparator circuit 14 in Step ST8 is also HIGH, it outputs a signal (Step ST9).

As the signal is supplied from the fall determining section 7, the power source 8 is turned off. As the power source 8 is turned off, the head retracting section 15 retracts the magnetic head 22 from the position where it is located opposite to the hard disc 21 by means of the auto-retract feature (Step ST10).

Note that, when the size of the synthetic acceleration vector is found to be close to 0, the size of the synthetic acceleration vector is stabilized for a predetermined time period without fail. Therefore, if $\underline{a}$ is a value close to 0, it may alternatively be so arranged as to detect that the size of the synthetic acceleration vector at the clock time T0 is smaller than $\underline{a}$ and supply HIGH to the fall determining section 7 instead of the processing operation from Step ST2 to Step ST4. With this alternative arrangement, it is possible to simplify the configuration of the electronic appliance 1.

Now, the first upper limit value M1 and the second upper limit value M2 will be described in terms of specific values below.

Figure 7:
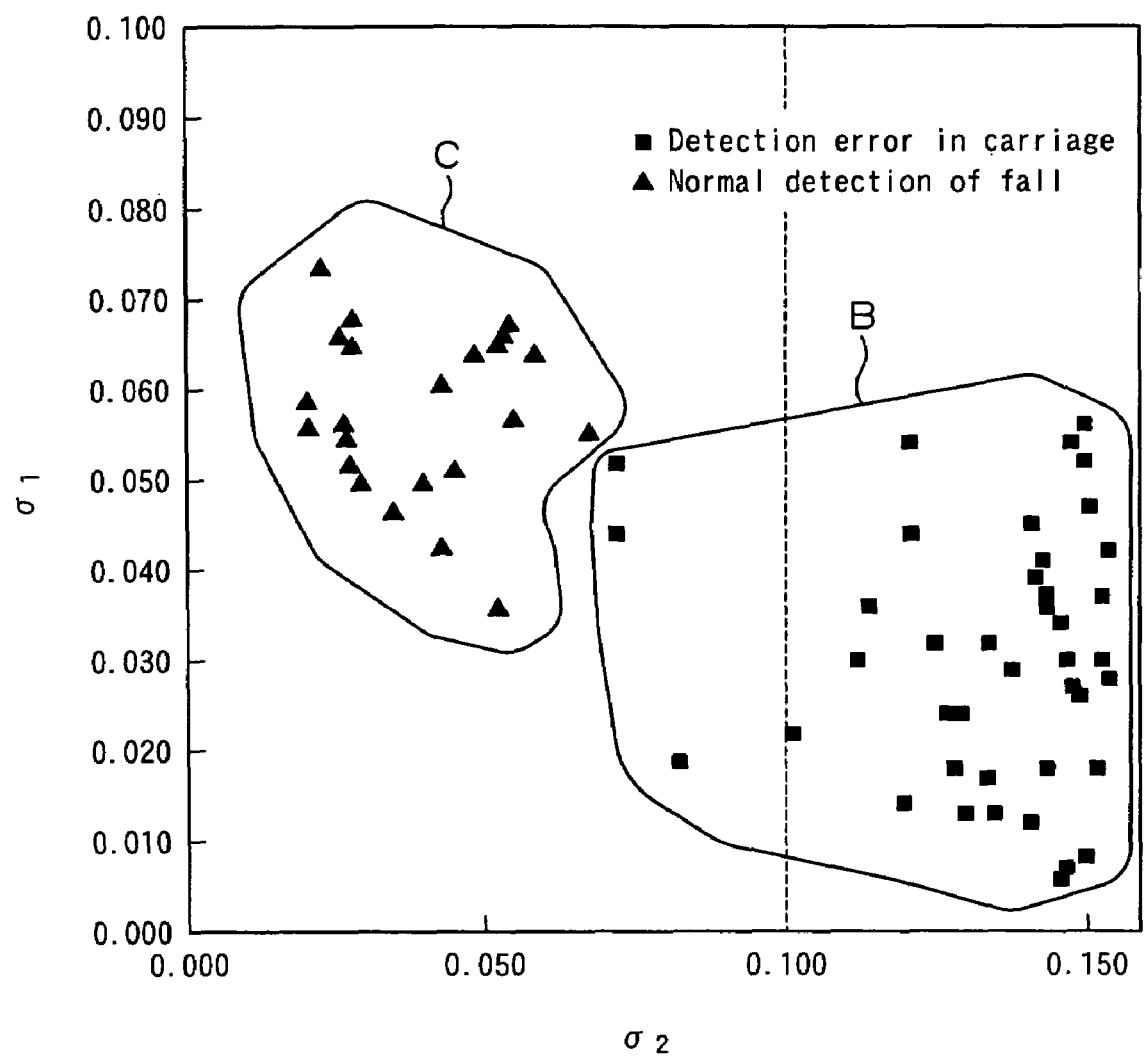
FIG. 7 is a graph illustrating the standard deviation σ1 and the standard deviation σ2 when an electronic appliance is being carried by a person and when the electronic appliance is falling.

In an experiment where the electronic appliance 1 was operated to observe the standard deviation σ1 and the standard deviation σ2, it was found that the standard deviation σ1 is within the range between 0.005 and 0.060 while the standard deviation σ2 is not smaller than 0.070 and mostly greater than 0.1 as indicated by B in FIG. 7.

Then, the electronic appliance 1 was dropped to fall to observe the standard deviation σ1 and the standard deviation σ2 to find that the standard deviation σ1 is within the range between 0.035 and 0.075 while the standard deviation σ2 is within the range between 0.020 and 0.070 as indicated by C in FIG. 7.

From the above-described observations, it will be clear that a fall of the electronic appliance 1 can be detected by 100% when a value slightly greater than 0.075 is selected for the upper limit value M1 and a value slightly grater than 0.070 is selected for the second upper limit value M2.

While it is possible to avoid detection errors due to oscillations that may arise when the electronic appliance 1 is being carried by selecting a value slightly smaller than 0.07 for the second upper limit value M2, the standard deviation σ2 can take a value close to 0.07 when the electronic appliance 1 is falling. Therefore, there can be instances where a fall of the electronic appliance 1 is not detected although it is actually falling if a value slightly smaller than 0.07 is selected for the standard deviation σ2. Additionally, it will be clear that the probability of detection error due to oscillations that may arise when the electronic appliance 1 is being carried can be reduced by about 10% when a value not greater than 0.1 is selected for the second upper limit value M2.

Thus, the first upper limit value M1 and the second upper limit value M2 are defined to be equal to 0.1 and 0.1 respectively. As the first upper limit value M1 and the second upper limit value M2 are defined to be equal to 0.1 and 0.1 respectively, it is possible to detect a fall of the electronic appliance 1 by 100% and remarkably minimize the probability of detection error where oscillations that arise when the electronic appliance 1 is being carried are mistaken for a fall.

Note that the standard deviation σ1 and the standard deviation σ2 at the time of a fall of the electronic appliance 1 and the standard deviation σ1 and the standard deviation σ2 at the time when the electronic appliance 1 is being carried can vary depending on the size and the shape of the electronic appliance 1. In other words, the first upper limit M1 and the second upper limit M2 are not particularly limited to the above-cited values and have to be defined appropriately depending on the size and the shape of the electronic appliance 1.

As described above, the electronic appliance 1 according to the invention detects that it is falling by detecting a fall candidate when the size of the synthetic acceleration vector stably shows a value smaller than $\underline{a}$ for a predetermined time period and also detecting that the stability of the electronic appliance 1 was found within a predetermined range from clock time T2 to clock time T1.

Thus, it is possible for the electronic appliance 1 to reduce the possibility of detection error that can arise when it is being carried to give rise to oscillations and the size of the synthetic acceleration vector temporarily becomes equal to 0. Then, it is possible to avoid a frequent activation of the auto-retract feature that often retracts the magnetic head 22 from the position where it is located opposite to the hard disc 21 by mistake.

Then, because it is possible to avoid a frequent activation of the auto-retract feature that often retracts the magnetic head 22 from the position where it is located opposite to the hard disc 21 by mistake, the electronic appliance 1 is free from unnecessary interruptions of the operation of reading data stored in the hard disc 21 that may arise when the electronic appliance 1 is oscillated while it is being carried. Thus, the capability of the electronic appliance 1 of reading data stored in the hard disc 21 is improved.

When the auto-retract feature is activated to retract the magnetic head 22 from the position where it is located opposite to the hard disc 21, the power source 8 is turned of and consequently electric power is consumed to a large extent. Therefore, as a result of avoiding a frequent activation of the auto-retract feature, the power consumption of the electronic appliance 1 is reduced to consequently prolong the service life of the battery.

Additionally, since the number of times of utilization of the auto-retract feature is limited, the electronic appliance 1 can enjoy a long period before the number of times of utilization of the auto-retract feature reaches the limit value when the auto-retract feature is activated less frequently. Then, consequently, it is possible to prolong the service life of the hard disc drive 9.

Additionally, since the stability from the clock time T2 to the clock time T1 is also utilized to detect a fall of the electronic appliance 1, it is possible to detect a fall if the size of the synthetic acceleration vector remains stable at a value that is not close to 0. Therefore, it is possible to detect that the electronic appliance 1 is not experiencing a fee fall but falling along a slope or falling and spinning. Thus, it is possible to protect the hard disc drive 9 when the electronic appliance 1 is falling in a mode other than free fall.

While the hard disc drive 9 is prevented from being destroyed by retracting the magnetic head 21 of the hard disc drive 9 from the position where it is located opposite to the hard disc 22 in this embodiment, the present invention may be applied in different ways. For example, the present invention may be applied so as to retract a magnetic head from the position where it is located opposite to a removable recording medium such as mini disc (tradename) in order to prevent the recording medium from being destroyed.

Now, a contents player for reproducing contents (images or sounds or images and sounds) realized by applying an electronic appliance 1 according to the invention will be described below.

Note that, in the following description of a contents player and the related drawings, the components same as those of the above-described electronic appliance 1 are denoted respectively by the same reference symbols.

Figure 8:
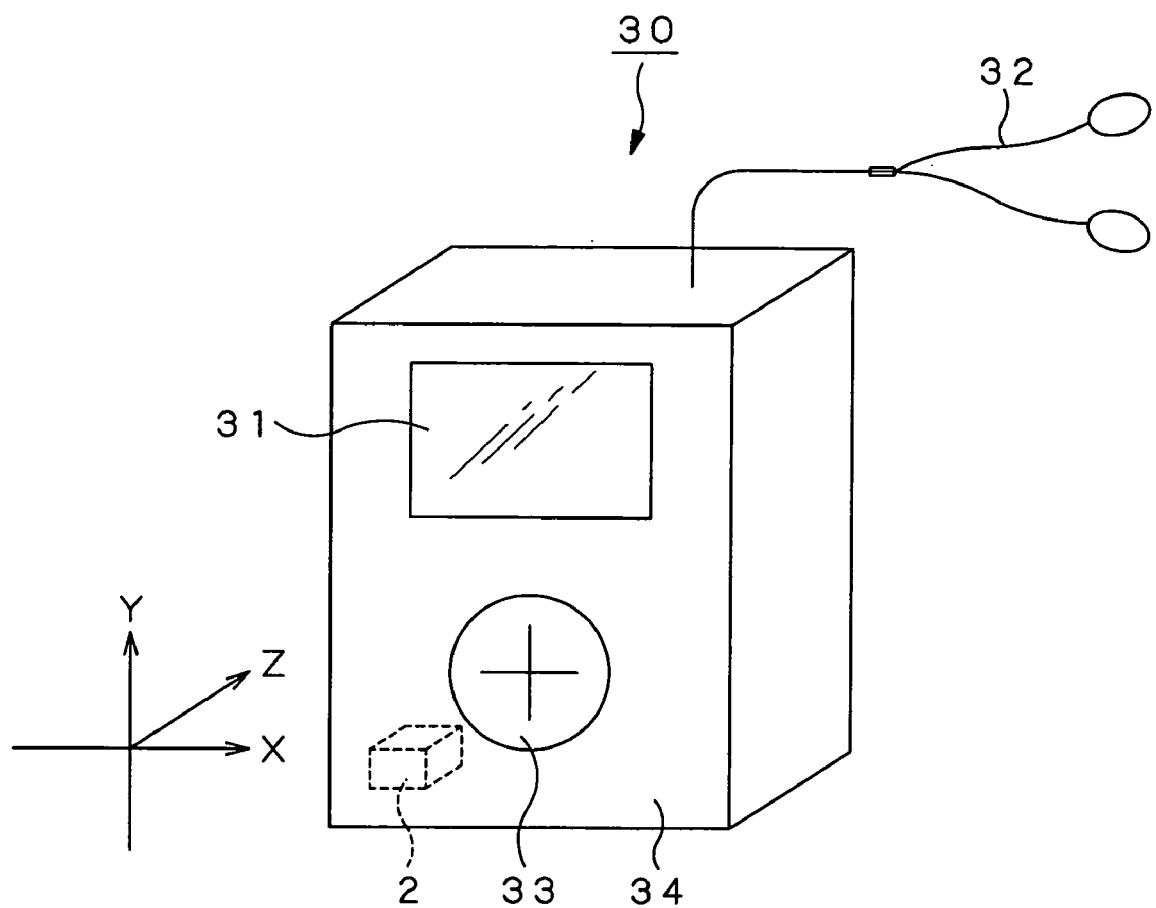
FIG. 8 is a schematic perspective view of an embodiment of contents reproduction apparatus according to the invention, illustrating its appearance.

FIG. 8 is a schematic perspective view of a contents player 30, illustrating its appearance.

Referring to FIG. 8, the contents player 30 has such a size that a person can carry it. The contents player 30 is provided with a display monitor 31 and a headphone 32 and the contents stored in an internal recording medium (hard disc 21) are output to them. The contents player 30 includes an operation section 33, which operation section 33 receives inputs from the user who is operating the operation section 33.

The contents player 30 can be connected to a computer by way of a predetermined interface (e.g., USB (universal serial bus)). Then, contents data are transmitted from the computer to the contents player 30 by way of the USB interface and stored in an internal storage medium (hard disc 21).

The contents player 30 is also equipped with an acceleration sensor 2. As indicated by arrows in FIG. 8, the directions of detection of this acceleration sensor 2 include the X-direction and the Y-direction, which are intra-planar directions of the main surface 34 of the cabinet from which the display monitor 31 and the head phone 32 are provided, and the Z-direction, which is orthogonal relative to both the X-direction and the Y-direction (and hence a direction that is orthogonal relative to the main surface 34 of the cabinet). Note, however, that these directions are only examples and any other directions may be used for the directions of detection of the acceleration sensor 2 so long as the acceleration sensor 2 can detect the accelerations in the directions of three axes that are orthogonal relative to each other.

Figure 9:
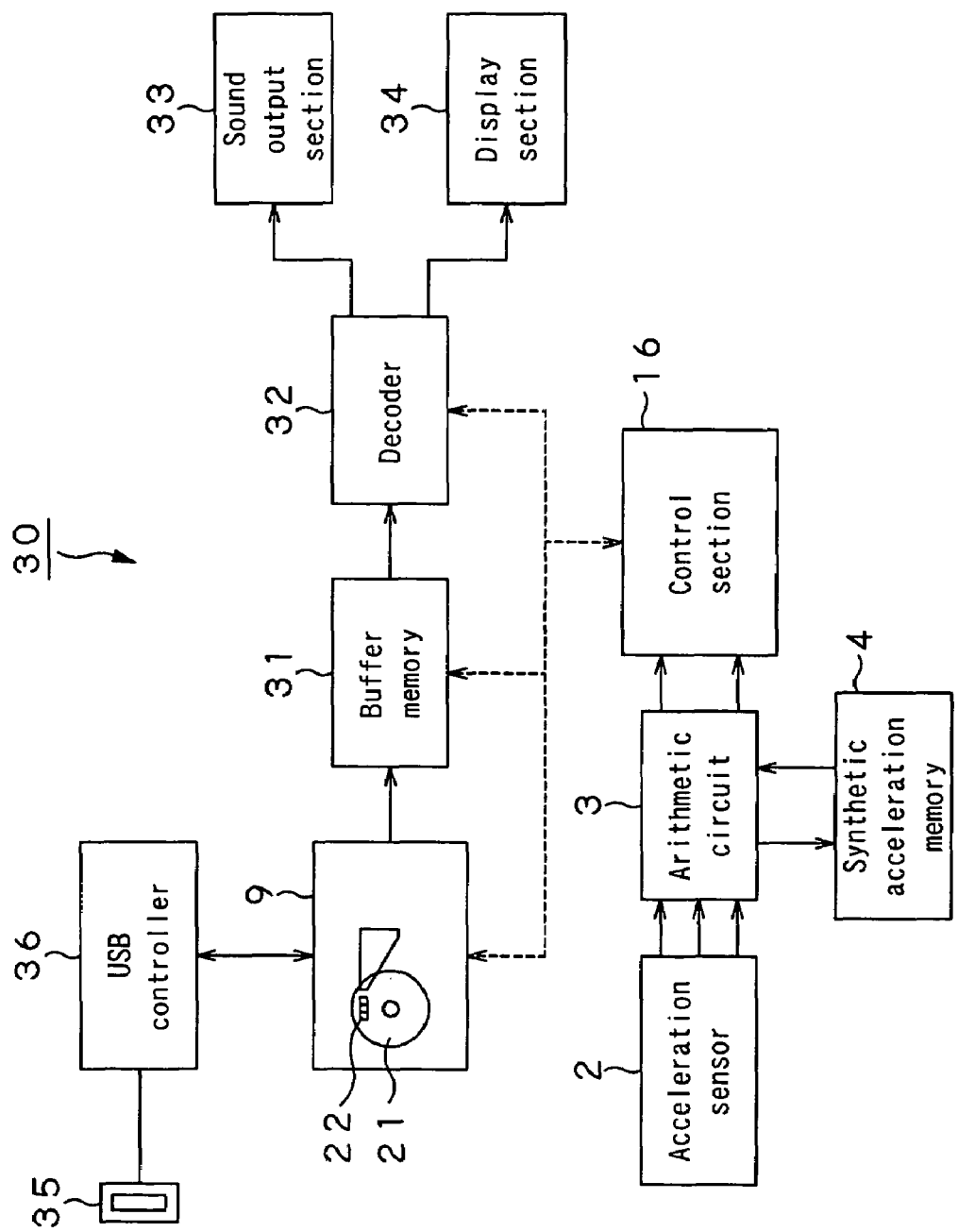
FIG. 9 is a schematic block diagram of the embodiment of contents reproduction apparatus of FIG. 8.

FIG. 9 is an internal schematic block diagram of the contents player 30.

The contents player 30 includes a hard disc drive 9 for storing contents data that are picture and music data, a buffer memory 41 for temporarily storing the contents data read out from the hard disc drive 9, a decoder 42 for decoding the contents data, a sound output section 43 for outputting the sound signals decoded by the decoder 42 to the outside and a display section 44 for displaying the image signals decoded by the decoder 42.

The contents player 30 also includes an acceleration sensor 2, an arithmetic circuit 3, a synthetic acceleration memory 4 and a control section 16. These components are the same as those of the above-described electronic appliance 1.

The contents player 30 is equipped with a USB terminal 45 for connecting the contents player 30 to an external computer and exchanging data with the latter and a USB controller 46 that is the controller of the USB terminal 45.

Contents data are transmitted from an external computer to the contents player 30 having the above-described configuration by way of the USB and recorded in the hard disc 21.

More specifically, as the contents player 30 is connected to an external computer by way of a USB cable, it is recognized by the computer as removable hard disc drive. Then, the computer transmits contents data by way of the USB cable. As contents data are transmitted from the computer, the USB controller 46 receives the contents data and subsequently writes them in the hard disc 21.

At the time of reproducing contents data, the contents player 30 is disconnected from the computer and operates as a stand along apparatus.

Figure 10:
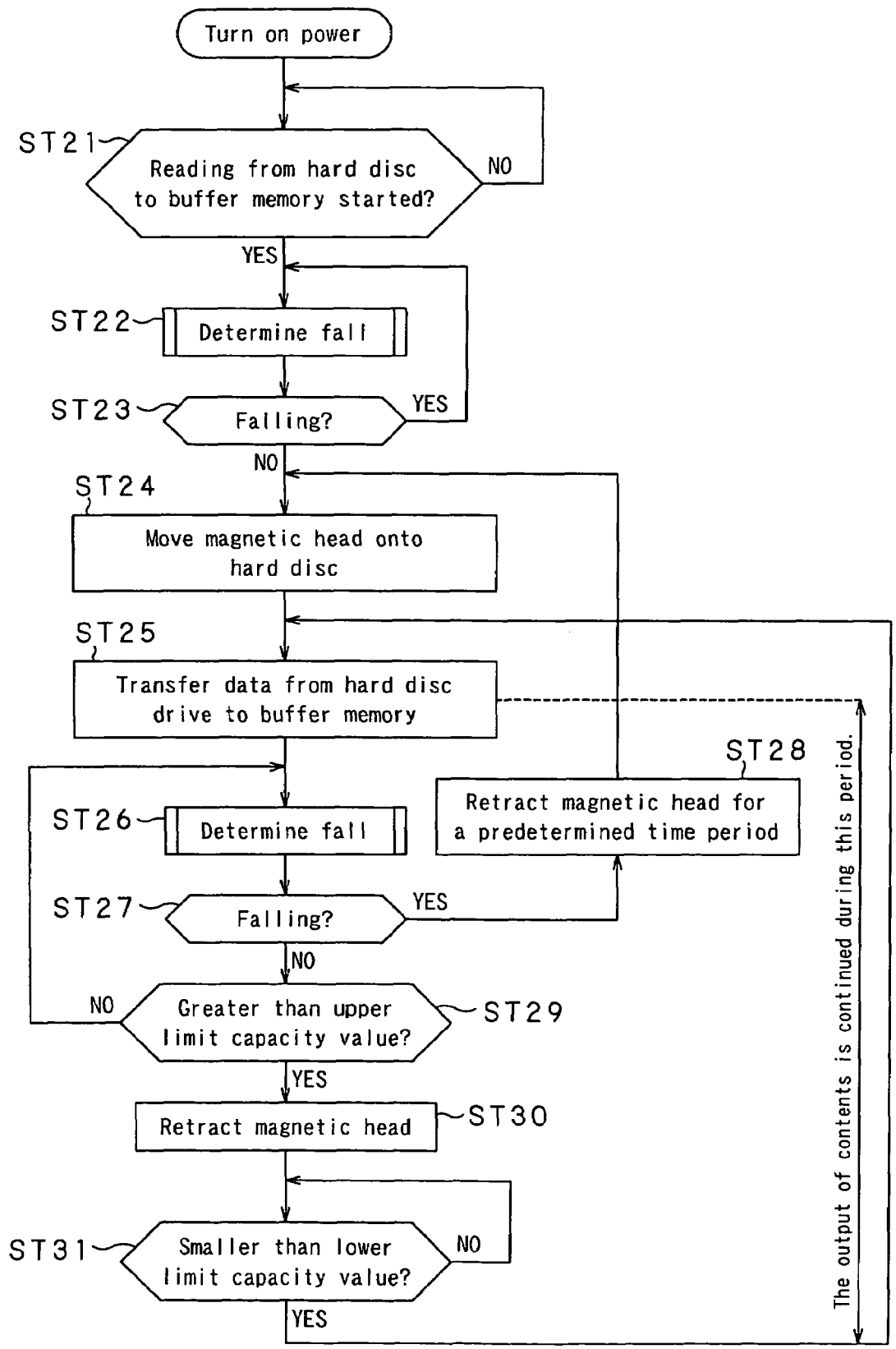
FIG. 10 is a flowchart of the reproduction process of the embodiment of contents reproduction apparatus of FIG. 8.

Now, the operation of the contents player 30 for reproducing contents data and for detecting a fall will be described below by referring to the flowchart of FIG. 10.

As the power source is turned on, the control section 16 of the contents player 30 starts a processing operation from Step ST21.

In Step ST21, the control section 16 determines if the user operated the contents player for reproduction and if an instruction for starting an operation of reading data from the hard disc 21 into the buffer memory 41 is given or not. If no instruction is given, the control section 16 stands by and waits for a read data instruction given to it. If, on the other hand, an instruction for starting an operation of reading data is given in Step ST21, the control section 16 proceeds to Step ST22.

Subsequently, in Step ST22, the control section 16 executes a process of determining if the contents player 30 is falling or not. More specifically, it executes a fall determining process as illustrated in FIG. 6.

Then, in Step ST23, the control section 16 determines if the contents player 30 is falling or not by referring to the outcome of the fall determining process. If it is determined in Step ST23 that the contents player 30 is falling, it returns to Step ST22 and once again determines if the contents player 30 is falling or not. If it is determined in Step ST22 that the contents player 30 is not falling as a result of the fall determining process, the control section 16 proceeds to Step ST24.

If it is determined that the contents player 30 is not falling, the control section 16 moves the magnetic head 22 to a predetermined position on the hard disc 21 in Step ST24.

Subsequently, in Step ST25, the control section 16 transfers data from the hard disc drive 9 to the buffer memory 41.

As data are accumulated in the buffer memory 41, the decoder 42 draws out the contents data from the buffer memory 41, decodes them and starts outputting them externally. Thereafter, if the magnetic head 22 is retracted from the hard disc 21, the decoder 42 keeps on decoding data until there is no contents data stored in the buffer memory 41.

Then, in Step ST26, the control section executes a fall determining process of determining if the contents player 30 is falling or not. More specifically, it executes a fall determining process as illustrated in FIG. 6.

Thereafter, in Step ST27, the control section 16 determines if the contents player 30 is falling or not by referring to the outcome of the fall determining process.

If it is determined that the contents player 30 is falling, the control section 16 proceeds to Step ST28. In Step ST28, the control section 16 retracts the magnetic head 22 from the hard disc 21 for a predetermined time period and then proceeds to Step ST24, where it moves the magnetic head 22 above the hard disc 21 once again.

If, on the other hand, it is determined that the contents player 30 is not falling, the control section 16 proceeds to Step ST29.

Subsequently, in Step ST29, the control section 16 determines if the amount of data stored in the buffer memory 41 exceeds the upper limit capacity value of the buffer memory 41 or not.

Figure 11:
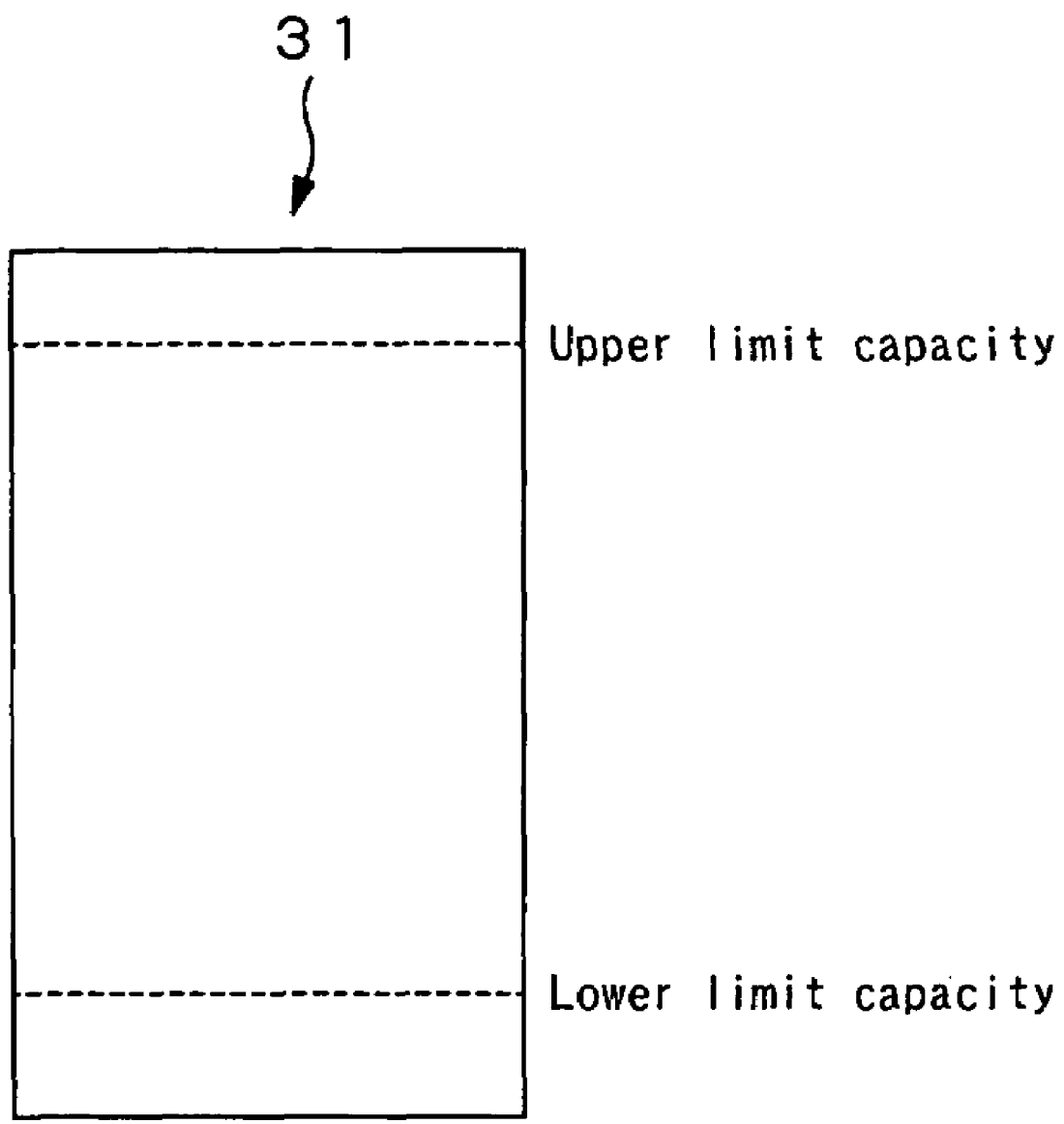
FIG. 11 is a graph illustrating the upper limit capacity and the lower limit capacity of a buffer memory.

As shown in FIG. 11, an "upper limit capacity value" is defined for the buffer memory 41 as a capacity value obtained by adding a predetermined margin to the largest capacity of the buffer memory 41, whereas a "lower limit capacity value" is defined for the buffer memory 41 as a capacity value obtained by adding a predetermined margin to 0.

In Step ST29, it is determined if the amount of data stored in the buffer memory 41 has already exceeded the upper limit capacity value or not.

If it is determined that the amount of data has not exceeded the upper limit capacity value, the control section 16 proceeds to Step ST25, where it further transfers contents data from the hard disc drive 9 to the buffer memory 41 and executes the processing operation of Step ST26 and Step ST27. On the other hand, if it is determined that the amount of data stored in the buffer memory 41 has already exceeded the upper limit capacity value, the control section 16 proceeds to Step ST30.

Subsequently, in Step ST30, the control section 16 retracts the magnetic head 22 from the hard disc 21.

Thereafter, in Step ST31, the control section 16 determines if the amount of data stored in the buffer memory 41 is not greater than the lower limit capacity value or not.

If it is determined that the amount of data is not smaller than the lower limit capacity value, the control section 16 stands by and waits for a process in Step ST31.

On the other hand, if it is determined that the amount of data is not greater than the lower limit capacity value, the control section 16 proceeds to Step ST25, where it further transfers data from the hard disc drive 9 to the buffer memory 41 and then repeats the processing operation from Step ST25 to Step ST31.

Then, the control section 16 repeats the above-described process until an instruction for ending the operation of reading data is given to it.

Thus, the contents player 30 that is adapted to execute the above-described process transfers data from the hard disc drive 9 to the buffer memory 41 on a burst basis and determines if the contents player 30 is falling or not only when it is transferring data. Additionally, when it is determined that the contents player 30 is falling and the magnetic head 22 is retracted and saved, data are still accumulated in the buffer memory 41 and hence the contents player 30 keeps on its output operation (of outputting sounds and images). In other words, the output operation of the contents player 30 is continued while the contents player 30 is falling. If it is determined that the contents player 30 is falling and the magnetic head 22 is retracted and saved, the control section 16 starts accessing the hard disc 21 once again after the elapse of a predetermined time period.

While the present invention is described above by referring to the accompanying drawings that illustrate preferred embodiments of the present invention, the present invention is by no means limited thereto and it may be clear to those skilled in the art that the above-described embodiments may be subjected to modifications, substitutions or equivalents thereof without departing from the spirit and scope of the present invention.

The invention claimed is:

1. An electronic appliance apparatus for detecting and processing motion, the apparatus comprising:
   an acceleration sensor for continuously detecting acceleration in first, second, and third directions;
   an acceleration vector detecting section for synthesizing the continuously detected acceleration into a plurality of acceleration vectors;
   memory for storing sizes of the acceleration vectors, and associating each of the sizes with a time that the corresponding acceleration vector was detected by the acceleration sensor;
   a first stability section for determining a first time of a first acceleration vector size that is less than a first predetermined value, and computing a first stability of the acceleration in a predetermined time frame before the first time;
   a second stability section for searching the memory for a second time before the first time of a most recent second acceleration vector size that is greater than a second predetermined value, and computing a second stability of the acceleration in a predetermined time frame before the second time; and
   a fall determining section for determining that the electronic appliance is falling if the first stability is within a first predetermined range and the second stability is within a second predetermined range.

2. The apparatus of claim 1, further comprising:
   a recording medium;
   a transferor for reading or writing data to the recording medium; and
   a retractor for retracting the transferor from a position where it is located opposite to the recording medium when the fall determining section determines that the electronic appliance is falling.

3. The apparatus of claim 2, wherein:
   the recording medium is a hard disk provided in the electronic appliance; and
   the transferor is a magnetic head for reading or writing data to the hard disk.

4. The apparatus of claim 1, wherein the first predetermined value is equal to 0.

5. A method for detecting a fall of an electronic device, the method comprising:
   continuously detecting acceleration in first, second, and third directions;
   synthesizing the continuously detected acceleration into a plurality of acceleration vectors;
   storing sizes of the acceleration vectors, and associating each of the sizes with a time that the corresponding acceleration vector was detected;
   determining a first time of a first acceleration vector size that is less than a first predetermined value, and computing a first stability of the acceleration in a predetermined time frame before the first time;
   searching the memory for a second time before the first time of a most recent second acceleration vector size that is greater than a second predetermined value, and computing a second stability of the acceleration in a predetermined time frame before the second time; and
   determining that the electronic appliance is falling if the first stability is within a first predetermined range and the second stability is within a second predetermined range.

6. The method of claim 5, wherein the first predetermined value is equal to 0.

7. A content reproduction apparatus comprising:
   a reproduction head for reading data from a disk-shaped recording medium;
   buffer memory for temporarily buffering data read from the recording medium;
   a decoding section for decoding and outputting the data accumulated in the buffer memory;
   an acceleration sensor for continuously detecting acceleration in first, second, and third directions;
   an acceleration vector detecting section for synthesizing the continuously detected acceleration into a plurality of acceleration vectors;
   memory for storing sizes of the acceleration vectors, and associating each of the sizes with a time that the corresponding acceleration vector was detected by the acceleration sensor;
   a first stability section for determining a first time of a first acceleration vector size that is less than a first predetermined value, and computing a first stability of the acceleration in a predetermined time frame before the first time;

a second stability section for searching the memory for a second time before the first time of a most recent second acceleration vector size that is greater than a second predetermined value, and computing a second stability of the acceleration in a predetermined time frame before the second time;

a fall determining section for determining that the electronic appliance is falling if the first stability is within a first predetermined range and the second stability is within a second predetermined range; and a retracting section for retracting the reproduction head from the disk-shaped recording medium when the fall determining section determines that the electronic appliance is falling.

8. The apparatus of claim 7, wherein:

the reproduction head reads data from the recording medium and transfers the data to the buffer memory when an amount of data accumulated in the buffer memory does not exceed a predetermined amount; and the fall determining section determines whether or not the electronic appliance is falling when the reproduction section is reading data.

9. The apparatus of claim 7, wherein the decoding section continues reading out data from the buffer memory and decoding the read out data when the fall determining section determines that the electronic appliance is falling.

* * * * *